(12) United States Patent
Haeufgloeckner

(10) Patent No.: US 10,105,786 B2
(45) Date of Patent: Oct. 23, 2018

(54) DEVICE FOR CHANGING ELECTRODE CAPS OF A WELDING UNIT AND WELDING METHOD

(71) Applicant: Robert Bosch GmbH, Stuttgart (DE)

(72) Inventor: Juergen Haeufgloeckner, Schneeberg (DE)

(73) Assignee: Robert Bosch GmbH, Stuttgart (DE)

( * ) Notice: Subject to any disclaimer, the term of this patent is extended or adjusted under 35 U.S.C. 154(b) by 972 days.

(21) Appl. No.: 14/341,424

(22) Filed: Jul. 25, 2014

(65) Prior Publication Data
US 2015/0053653 A1    Feb. 26, 2015

(30) Foreign Application Priority Data
Aug. 22, 2013    (DE) .................. 10 2013 216 623

(51) Int. Cl.
*B23Q 3/155* (2006.01)
*B23K 11/36* (2006.01)
*B23K 11/30* (2006.01)
*B23B 5/16* (2006.01)

(52) U.S. Cl.
CPC ...... *B23K 11/3072* (2013.01); *B23K 11/3063* (2013.01); *B23Q 3/15546* (2013.01); *B23B 5/166* (2013.01); *Y10T 409/304256* (2015.01); *Y10T 483/134* (2015.01); *Y10T 483/138* (2015.01); *Y10T 483/17* (2015.01)

(58) Field of Classification Search
CPC ........... B23K 11/3063; B23K 11/3072; Y10T 409/304144; Y10T 409/3042; Y10T 409/304256; Y10T 483/17; Y10T 29/5168; Y10T 483/134; B23Q 3/15546

USPC .............. 219/86.8; 409/138–140; 483/16, 9; 29/50
See application file for complete search history.

(56) References Cited

U.S. PATENT DOCUMENTS

| | | | | |
|---|---|---|---|---|
| 4,344,221 A | * | 8/1982 | Pagani ............... | B23Q 3/15526 483/39 |
| 5,248,867 A | * | 9/1993 | Ohba ................. | B23H 1/04 219/69.15 |
| 5,692,998 A | * | 12/1997 | Weigel .............. | B23Q 3/15546 279/126 |

(Continued)

FOREIGN PATENT DOCUMENTS

| | | | |
|---|---|---|---|
| JP | 02-172646 A | * | 7/1990 |
| JP | 2005-205431 A | * | 8/2005 |

OTHER PUBLICATIONS

Definition of "robot", Merriam-Webster's Collegiate Dictionary, 10th ed., copyright 1998, p. 1013.*

(Continued)

*Primary Examiner* — Erica E Cadugan
(74) *Attorney, Agent, or Firm* — Maginot, Moore & Beck LLP

(57) ABSTRACT

A device is configured for changing electrode caps of a welding unit. The device includes at least one reserve unit configured to hold in reserve electrode caps which are required for welding with the welding unit. The device also includes a cap changing unit configured to change an electrode cap mounted on a welding tool for another electrode cap held in reserve in the reserve unit. The cap changing unit is configured to arrange the electrode cap demounted from the welding tool in the at least one reserve unit.

14 Claims, 1 Drawing Sheet

(56) References Cited

U.S. PATENT DOCUMENTS

| | | | | |
|---|---|---|---|---|
| 5,734,141 | A * | 3/1998 | Voilmy | B23K 11/3072 |
| | | | | 219/86.25 |
| 9,505,080 | B2 * | 11/2016 | Nakajima | B23K 11/3063 |
| 9,604,331 | B2 * | 3/2017 | Noma | B23Q 3/15706 |
| 2003/0156401 | A1 * | 8/2003 | Komine | B23B 31/02 |
| | | | | 361/815 |
| 2004/0149692 | A1 * | 8/2004 | Masanori | B23K 11/314 |
| | | | | 219/86.25 |
| 2015/0258625 | A1 * | 9/2015 | Yao | B23K 11/3072 |
| | | | | 451/70 |

OTHER PUBLICATIONS

Machine Translation JP 2005-205431 A, which JP '431 was published Aug. 2005.*

* cited by examiner

DEVICE FOR CHANGING ELECTRODE CAPS OF A WELDING UNIT AND WELDING METHOD

This application claims priority under 35 U.S.C. § 119 to patent application number DE 10 2013 216 623.0, filed on Aug. 22, 2013 in Germany, the disclosure of which is incorporated herein by reference in its entirety.

BACKGROUND

The present disclosure relates to a device for changing electrode caps of a welding unit, and to a welding method.

In car body engineering, on a production line or in a manufacturing plant individual car body parts are assembled and welded by way of a welding unit to form a car body. For this purpose, not only does the welding unit have to execute a large number of welding operations for one car body, but the welding unit also has to successively manufacture a number of car bodies which are to be processed one after another on the production line or in the manufacturing plant.

The problem with this is that on a production line the number of different vehicle models and the associated variants, such as convertible, notchback, fastback etc., is continuously increasing and all of these model types and model variants are manufactured in one manufacturing plant. This means that the car bodies run through the manufacturing plant in an arbitrary order and with a cycle sequence or time span in between that is as short as possible. Thus, it is possible for the sequence of welding operations to be carried out in each case, for example the sequence of welding spots, not to be defined. However, the same welding tools, in particular welding tongs, are used for all models.

The problem with this is also that, as the number of model variants increases, the number of welding operations for a welding tool and the variance of these welding operations also increase. In this case, the material combinations and the position of the welding spots on the car body to be manufactured in each case are different. In addition, each welding tool, such as in particular welding tongs, is equipped with a fixed electrode cap which has a fixed electrode diameter, wherein the diameter of the electrode cap and thus of the cap surface area is produced using corresponding electrode cap milling tools.

Since the overall sheet thickness varies for example from 1.4 mm to 6.0 mm and differences of 0.6 mm to 2.5 mm arise in the individual sheet thicknesses, the requirements placed on the cap surface area frequently come into conflict. For a material connection at the lower sheet thickness end a diameter of 4 mm and for a material connection at the upper sheet thickness end a diameter of 8 mm would be necessary for the electrode cap surface area. However, since the electrode cap surface area can be milled only with one diameter, a compromise has to be made in relation to the welds, such as welding spots, etc., to be produced. This influences the quality of the welds, such as welding spots, produced and the outlay which is required for production in order to ensure the quality of the welds. In addition, the time for manufacturing a car body should be as short as possible in order to optimize the throughput and thus the productivity of the production line or manufacturing plant.

Thus, the variance of the welding tasks in such manufacturing plants represents a major problem.

SUMMARY

It is therefore the object of the present disclosure to provide a device and a method for making available electrode caps of a welding unit, by way of which the above-mentioned problems can be solved. In particular, a device and a method for making available electrode caps of a welding unit are intended to be provided, wherein the demanded quality of the welds, such as welding spots, weld seams etc., can be ensured in a manufacturing plant in spite of the increased model range, and starting up and maintenance in production are made easier.

This object is achieved by a device for changing electrode caps of a welding unit according to the description below. The device comprises at least one reserve unit for holding in reserve electrode caps which are required for welding with the welding unit, and a cap changing unit for changing an electrode cap mounted on a welding tool for another electrode cap held in reserve in the reserve unit, wherein the cap changing unit is configured to arrange the electrode cap demounted from the welding tool in the reserve unit.

With the device, it is possible to divide up the range of welds, such as welding spots, weld seams etc., into a plurality of electrode cap diameters. Thus, the welding process windows for the welds can be widened and the welding result improved. This stabilizes the quality of the welding results and makes starting up and maintenance in production easier.

In this way, it is possible to ensure the quality in car body engineering with the device. Furthermore, the requirements placed on the throughput and thus the productivity of the production line or manufacturing plant are met.

In addition, a cost saving in the starting up and maintenance of the manufacturing plants is possible with the device. Furthermore, the reuse of electrode caps results in more economical use of resources and thus a reduction in waste and a lowering of production costs.

Advantageous further configurations of the device are specified in the description below.

According to one exemplary embodiment, the device additionally comprises a handling robot for supplying an electrode cap held in reserve in the reserve unit to a welding robot on which the welding tool is mounted. In this case, the handling robot may additionally be configured for milling or for guiding up to a corresponding cap milling unit.

The device may additionally be equipped with at least one cap milling unit for milling an electrode cap to a size which is required for a welding operation executed by the welding unit. In this case, the cap milling unit is possibly configured to mill an electrode cap when the wear to the electrode cap exceeds an admissible value and the maximum number of milling steps has not been exceeded.

In the device, the cap changing unit may be configured such that it exchanges an electrode cap mounted on the welding tool for another electrode cap held in reserve in the reserve unit when the wear to the electrode cap exceeds an admissible value and the maximum number of milling steps has been exceeded.

The above-described device may be part of a welding unit which additionally comprises a welding controller for controlling a welding tool for welding components.

Furthermore it is possible for the welding unit to have a welding robot on which the welding tool is arranged.

In the welding unit, the welding controller may be configured to access a tool parameter data set in order to transmit to the welding robot the data for an electrode cap for the welding tool that are required for the next welding operation with the welding tool.

The object is additionally achieved by a welding method for welding components in a welding unit according to the description below. In the welding method, a welding tool is controlled by a welding controller, wherein use is made of a device which comprises at least one reserve unit for holding in reserve electrode caps which are required for welding in the welding unit, and a cap changing unit for changing an electrode cap mounted on the welding tool for another electrode cap held in reserve in the reserve unit, and wherein the cap changing unit arranges the electrode cap demounted from the welding tool in the reserve unit.

The welding method achieves the same advantages as mentioned above with respect to the device.

Further possible implementations of the disclosure also comprise combinations, not explicitly mentioned, of features or embodiments that are described above or in the following text with regard to the exemplary embodiments. In this case, a person skilled in the art will also add individual aspects as improvements or additions to the respective basic form of the disclosure.

BRIEF DESCRIPTION OF THE DRAWINGS

The disclosure is described in more detail in the following text with reference to the appended drawing and by way of exemplary embodiments. In the drawing.

DETAILED DESCRIPTION

Figure 1:
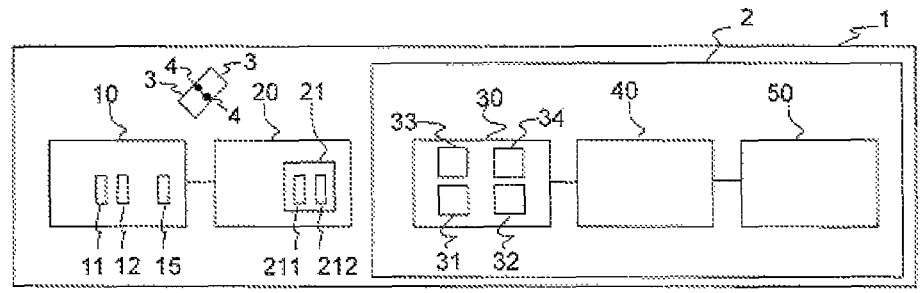
FIG. 1 shows a block diagram of a welding unit having a device according to a first exemplary embodiment.
Figure 2:
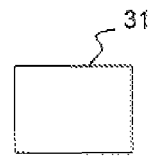
FIG. 2 to FIG. 7 each show a simplified illustration in plan view or side view of an electrode cap which can be used in a device according to the first exemplary embodiment.
Figure 3:
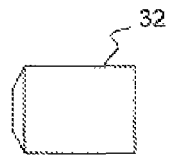
Figure 4:
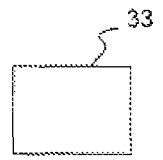
Figure 5:
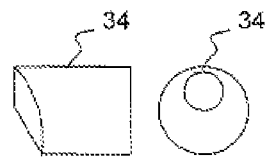
Figure 6:
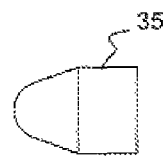
Figure 7:
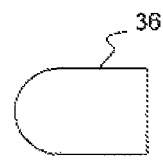

In the figures, unless otherwise stated, identical or functionally identical elements have been provided with the same reference numerals.

FIG. 1 very schematically shows a welding unit 1 having a device 2, used in the welding of components 3 with for example at least one welding spot 4. The welding unit 1 additionally comprises a welding controller 10 which controls a welding robot 20. The device 2 is arranged externally with respect to both the welding controller 10 and the welding robot 20. Therefore, the device 2 can also be known as an external device 2. In addition, the device 2 has the function of a cap station, as described in the following text, and so can also be designated as such. The welding unit may be part of a manufacturing plant, for example a production line for vehicles, in particular bodies for vehicles, etc., furniture, building constructions, etc.

In FIG. 1, various tool parameter data sets 11, 12 and a wear counter 15 are stored in the welding controller 10. The welding robot 20 guides a welding tool 21 which has identifications 211, 212 with regard to electrode caps. The welding tool 21 may for example be welding tongs which carry out spot welding or produce a welding spot 4. However, the welding tool 21 may also be configured such that it can produce a weld seam.

In FIG. 1, the device 2 has a reserve unit 30, an automatic cap changer or a cap changing unit 40, and a cap milling tool or a cap milling unit 50. The device 2 has no mechanical connection to the welding controller 10. The device 2 also has no electrical connection to the welding controller 10. The two systems of the device 2 and the welding controller 10 operate independently. The device 2 is controlled via the welding robot 20.

The reserve unit 30 holds in reserve electrode caps 31, 32, 33, 34 which are required for welding with the welding unit 1. The reserve unit 30 also serves for supplying the electrode caps 31, 32, 33, 34 to the cap changing unit 40. Thus, the reserve unit 30 can also be known as a supply unit and/or magazine for electrode caps 31, 32, 33, 34.

The cap changing unit 40 can mount one of the electrode caps 31, 32, 33, 34 on the welding tool 21 such that the welding tool 21 can execute a weld as per the mounted electrode cap. If an electrode cap of the electrode caps 31, 32, 33, 34 is already mounted on the welding tool 21, the cap changing unit 40 changes the mounted electrode cap for another electrode cap 31, 32, 33, 34 held in reserve in the reserve unit 30. In this case, the cap changing unit 40 can change a worn electrode cap for a new electrode cap of the same type and/or size. In addition, the cap changing unit 40 can change one of the electrode caps 31, 32, 33, 34 for another of the electrode caps 31, 32, 33, 34 which is of a different type and/or size than the electrode cap previously mounted on the welding tool 21.

The cap milling unit 50 can mill one of the electrode caps 31, 32, 33, 34 to a size which is required for a welding process executed by the welding unit 1. The size or surface area of the electrode cap 31, 32, 33, 34 determines the size or surface area of the welding result produced, for example of a welding spot 4.

Thus, in the present exemplary embodiment, a device 2 having a reserve unit 30 for holding in reserve and supplying electrode caps 31, 32, 33, 34 having different contact areas is provided as an independent machine. In addition to this there is a cap changing unit 40 and a cap milling unit 50 as an automatic changing and milling unit. The reserve unit 30 comprises a number of cap magazines for accommodating electrode caps 31, 32, 33, 34 having different cap surfaces.

FIG. 2 to FIG. 7 each show examples of electrode caps 31, 32, 33, 34, 35, 36 having different cap surfaces, as set down in German Standard DIN 44750. The cap surfaces differ in the diameter of the cap contact area. The electrode caps 31, 32, 33, 34, 35, 36 can each be held in reserve in the device 2 in the reserve unit 30 and be supplied to the cap changing unit 40 and/or to the cap milling unit 50.

In order that the electrode caps 31, 32, 33, 34, 35, 36 are distinguishable from one another, the welding tool 21 in FIG. 1 has a separate identification 211, 212 for each selectable electrode cap of the electrode caps 31, 32, 33, 34 held in reserve in the reserve unit 30. Thus, the welding controller 10 comprises a separate tool parameter data set 11, 12 for each of these identifications 211, 212, that is to say the tool parameter data set 11 for the identification 211 and the tool parameter data set 12 for the identification 212. A separate electrode maintenance concept can be defined for each of these parameter data sets 11, 12. Said concept can be adapted optimally to the welding tasks assigned to this electrode cap. For example, all of the electrode caps 31, 32, 33, 34, 35, 36 can be mountable on the welding tool 21. However, it is also possible for only some of the electrode caps 31, 32, 33, 34, 35, 36 to be mountable on the welding tool 21, for example the electrode caps 31, 32.

A welding method which is executed with the welding unit 1 proceeds in the manner described in the following text.

The welding robot 20 knows the tool data for each spot to be welded, that is to say the electrode cap of the electrode caps 31, 32, 33, 34 that is defined for this spot to be welded. Prior to welding in each case, the welding robot 20 acquires from the device 2 the electrode cap of the electrode caps 31, 32, 33, 34 that is to be used as per the tool data. To this end, the welding robot 20 travels to a position defined for this purpose and transmits the requirement for a cap change to the cap changing unit 40. Thereupon, the cap changing unit 40 changes the electrode cap in accordance with the specification by the welding robot 20 and deposits in the reserve unit 30, in particular the magazine, provided for this purpose, of the reserve unit 30, an electrode cap of the electrode caps 31, 32, 33, 34 that has been removed from the welding robot 20. Thus, the deposited electrode cap can subsequently be used again. In this case, "changes" means both the case in which one of the electrode caps 31, 32, 33, 34 is already mounted on the welding robot 20 and the case in which none of the electrode caps 31, 32, 33, 34 is as yet mounted on the welding robot 20. Once the cap changing unit 40 has changed the electrode cap, the welding robot 20 travels into its welding spot position and selects that spot on the welding controller 10 which is to be welded at this time with the electrode cap mounted on the welding tool 21.

The spot is welded with the aid of a controller of the welding controller 10. In this case, the welding controller 10 updates the actual welding values in the associated tool parameter data set 11, 12.

The welding controller 10 checks whether the requirements for the milling of the electrode cap 31, 32, 33, 34 mounted on the welding tool 21 have been met. If the requirements for the milling have been met, the wear counter 15 is greater than the maximum admissible wear of the corresponding mounted electrode cap 31, 32, 33, 34. Otherwise, the wear counter 15 is less than or equal to the maximum admissible wear of the corresponding mounted electrode cap 31, 32, 33, 34.

If the requirements for the milling of the electrode cap 31 mounted for example on the welding tool 21 have been met, the welding controller 10 transmits this milling requirement to the welding robot 20. The welding robot 20 in turn passes this requirement on to the cap changing unit 40, mills the mounted electrode cap 31 with the cap milling unit 50 and confirms the requirement to the welding controller 10. The cap changing unit 40 removes the currently mounted electrode cap 31 of the welding tool 21 and deposits the demounted electrode cap 31 in the working position, provided therefor, in the reserve unit 30. Following this, the welding robot 20 fetches the electrode cap of the next selected welding spot 4, for example the electrode cap 32, from the working position of this electrode cap in the reserve unit 30 and attaches it to the welding tool 21.

If the corresponding electrode cap 31, 32, 33, 34 has reached the maximum number of milling cuts, that is to say can no longer be milled with the cap milling unit 50, a change of the electrode cap is necessary instead. This state, too, is communicated to the welding robot 20. The welding robot 20 transmits this information likewise to the cap changing unit 40. In the cap changing unit 40, the newly selected electrode cap is removed from its working position on the welding robot 20 and a new electrode cap is moved from the reserve unit 30 into the working position of the cap changing unit 40. The new electrode cap is then changed, as described above in the case of milling.

Thus, the welding robot 20 can, depending on the welding task, acquire the necessary electrode cap 31, 32, 33, 34 from the device 2 or deposit it again there. The information which the welding robot 20 is intended to take from the electrode caps 31, 32, 33, 34 is controlled via the tool parameter data sets 11, 12 of the welding controller 10. Accordingly, the electrode cap of the electrode caps 31, 32, 33, 34 that has been removed from the device 2 is not discarded but is deposited in the device 2 again. When a cap has to be replaced, it is replaced via the cap changing unit 40 as a central changer having a connection to the reserve unit 30.

The new electrode cap of the electrode caps 31, 32, 33, 34 thus comes from magazines which the device 2 comprises.

The milling of one of the electrode caps 31, 32, 33, 34 from the device 2 can be carried out as follows. The welding robot 20 travels with that electrode cap of the electrode caps 31, 32, 33, 34 that is to be milled into the corresponding cap milling unit 50, which is determined depending on the diameter of the electrode cap to be milled, and after milling deposits the electrode cap in the device 2, to be more precise in the reserve unit 30.

Figure 8:
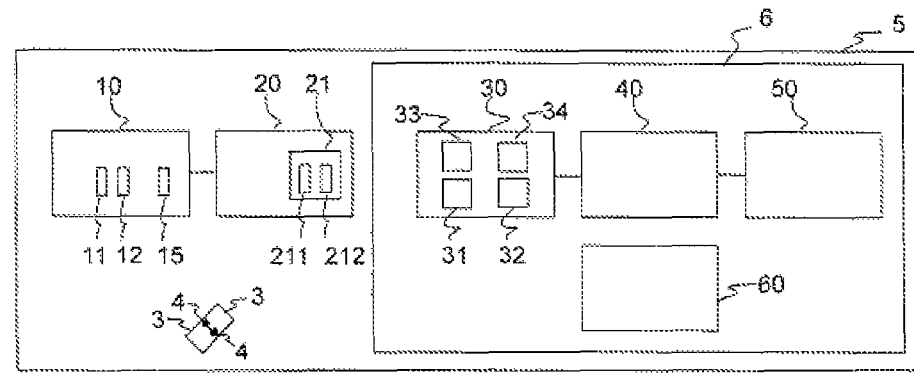
FIG. 8 shows a block diagram of a welding unit having a device according to a second exemplary embodiment.

FIG. 8 very schematically shows a welding unit 5 having a device 6. The welding unit 5 in accordance with the second exemplary embodiment is constructed in a very similar manner to the welding unit 1 in accordance with the first exemplary embodiment. In addition, the device 6 in accordance with the second exemplary embodiment is constructed in a very similar manner to the device 2 in accordance with the first exemplary embodiment. The difference between the device 6 in accordance with the second exemplary embodiment and the device 2 in accordance with the first exemplary embodiment is, however, that the device 6 has a handling robot 60 in addition to the units 30, 40, 50.

The handling robot 60 can carry out tasks in addition to, in particular in parallel with, the welding robot 20. In particular, the handling robot 60 can mill the electrode caps 31 to 36 or guide them up to the corresponding cap milling unit 50 for milling and/or change the electrode caps 31 to 36 in the device 6 and/or supply the required electrode cap 31 to 36 to the welding robot 20.

As a result, in the welding unit 5 in accordance with the present exemplary embodiment, the welding robot 20 has to carry out fewer tasks than the welding robot 20 in the welding unit 1 in accordance with the first exemplary embodiment. As a result, the welding robot 20 in the welding unit 5 is temporarily relieved. Thus, the productivity of the welding unit 5 can be increased compared with the welding unit 1 and thus the superordinate manufacturing plant.

Otherwise, the welding unit 5 in accordance with the present exemplary embodiment is constructed in the same manner as the welding unit 1 in accordance with the first exemplary embodiment.

All of the above-described configurations of the welding units 1, 5, of the devices 2, 6, and of the welding method can be used individually or in any possible combinations. In particular, all of the features and/or functions of the above-described exemplary embodiments can be combined as desired. In addition, in particular the following modifications are conceivable.

The parts illustrated in the figures are illustrated schematically and can deviate in terms of their precise configuration from the forms shown in the figures, as long as the above-described functions thereof are ensured.

The reserve unit 30 and the cap milling unit 50 are scalable as required. Accordingly, the number of cap magazines of the reserve unit 30 depends on the number of necessary cap surface areas and thus on the range of welding tasks. In addition, the number of cap milling units 50 depends on the number of necessary cap surface areas and thus on the range of welding tasks. Depending on the cap surface area that is required, for example one cap milling unit 50 may be provided. It is also possible for only in each case one cap magazine of the reserve unit 30 and one cap milling unit 50 to be provided.

The device 2 can additionally have a monitoring sensor by way of which the overall function and/or individual functions of the device can be monitored or checked. The monitoring sensor may be mounted in particular on a sensor board. The monitoring sensor may be arranged in particular on the cap changing unit 40.

The function of the device 2 can be displayed on a user interface in the form for example of a screen. Depending on requirements, the device 2 can be controlled either from the user interface and/or the welding controller.

The function of the device 2 can also be implemented at least partially by way of software.

What is claimed is:

1. A device for changing electrode caps of a welding unit, the device comprising:
   at least one reserve unit configured to hold in reserve a plurality of electrode caps which are used by a welding tool of a welding robot of the welding unit to perform welding operations; and
   a cap changing unit configured to demount an electrode cap mounted on the welding tool for another electrode cap of the plurality of electrode caps held in reserve in the at least one reserve unit, the cap changing unit further configured to arrange the electrode cap demounted from the welding tool in the at least one reserve unit,
   wherein the welding unit includes a welding controller electrically connected to the welding robot and configured to control the welding robot, the welding controller including a wear counter configured to monitor wear of the electrode cap mounted on the welding tool,
   wherein the cap changing unit is configured to receive an electrode change signal from the welding robot when the wear counter determines that the electrode cap mounted on the welding tool has been worn beyond a maximum permissible wear,
   wherein the plurality of electrode caps held in reserve each have a separate identification,
   wherein the cap changing unit is configured to select a particular electrode cap of the plurality of electrode caps held in reserve based on the separate identification, and
   wherein the device has no mechanical connection to the welding controller and no electrical connection to the welding controller, such that the device and the welding controller are configured to operate independently.

2. The device according to claim 1, further comprising:
   a handling robot configured to supply one of the electrode caps of the plurality of electrode caps held in reserve in the at least one reserve unit to the welding robot on which the welding tool is mounted.

3. The device according to claim 2, wherein:
   the handling robot is additionally configured to mill the electrode cap demounted from the welding tool, and
   the handling robot is further configured to guide the electrode cap demounted from the welding tool to a corresponding cap milling unit.

4. The device according to claim 1, further comprising at least one cap milling unit configured to mill the electrode cap demounted from the welding tool to a size which is required for a welding operation executed by the welding unit.

5. The device according to claim 4, wherein the at least one cap milling unit is configured to mill the electrode cap mounted on the welding tool when wear to the electrode cap mounted on the welding tool exceeds a permissible value and a maximum number of milling steps has not been exceeded.

6. The device according to claim 1, wherein the cap changing unit is configured to exchange the electrode cap mounted on the welding tool for the other electrode cap of the plurality of electrode caps held in reserve in the at least one reserve unit when wear to the electrode cap mounted on the welding tool exceeds a permissible value and a maximum number of milling steps has been exceeded.

7. The device according to claim 1, wherein in response to receiving the electrode change signal, the cap changing unit demounts the electrode cap mounted on the welding tool from the welding tool, arranges the electrode cap demounted from the welding tool in the at least one reserve unit, and mounts the other electrode cap of the plurality of electrode caps held in reserve in the at least one reserve unit on the welding tool.

8. A welding unit, comprising:
   a welding robot including a welding tool mounted thereon;
   a welding controller electrically connected to the welding robot and configured to control the welding robot, the welding controller including a wear counter configured to monitor wear of an electrode cap mounted on the welding tool, the electrode cap used by the welding tool to perform welding operations;
   a device for changing the electrode cap of the welding tool, the device including
      at least one reserve unit configured to hold in reserve a plurality of additional electrode caps which are used by the welding tool to perform welding operations, and
      a cap changing unit configured to demount the electrode cap mounted on the welding tool for one of the additional electrode caps held in reserve in the at least one reserve unit, the cap changing unit further configured to arrange the electrode cap demounted from the welding tool in the at least one reserve unit,
   wherein the device is configured to receive an electrode change signal from the welding robot when the wear counter of the welding controller determines that the electrode cap mounted on the welding tool has been worn beyond a maximum permissible wear, and
   wherein the device has no mechanical connection to the welding controller and no electrical connection to the welding controller, such that the device and the welding controller are configured to operate independently.

9. The welding unit according to claim 8, wherein the device further comprises:
   a handling robot configured to supply the plurality of additional electrode caps held in reserve in the at least one reserve unit to the welding robot on which the welding tool is mounted.

10. The welding unit according to claim 9, wherein:
   the device further includes a cap milling unit, and
   the handling robot is further configured to guide the electrode cap demounted from the welding tool to the cap milling unit.

11. The welding unit according to claim 10, wherein the cap milling unit is configured to mill the electrode cap demounted from the welding tool to a size which is required for a welding operation executed by the welding unit.

12. The welding unit according to claim 11, wherein the cap milling unit is configured to mill the electrode cap mounted on the welding tool when wear to the electrode cap mounted on the welding tool exceeds a permissible value and a maximum number of milling steps has not been exceeded.

13. The welding unit according to claim 8, wherein the cap changing unit is configured to exchange the electrode cap mounted on the welding tool for the additional electrode cap of the plurality of additional electrode caps held in reserve when wear to the electrode cap mounted on the welding tool exceeds a permissible value and a maximum number of milling steps has been exceeded.

14. The welding unit according to claim 8, wherein in response to the device receiving the electrode change signal, the cap changing unit demounts the electrode cap mounted on the welding tool from the welding tool, arranges the electrode cap demounted from the welding tool in the at least one reserve unit, and mounts the additional electrode cap of the plurality of additional electrode caps held in reserve on the welding tool.

* * * * *